(12) United States Patent
Leshem et al.

(10) Patent No.: US 11,650,405 B2
(45) Date of Patent: May 16, 2023

(54) MICROSCOPE AND METHOD FOR COMPUTATIONAL MICROSCOPIC LAYER SEPARATION

(71) Applicant: SCOPIO LABS LTD., Tel Aviv (IL)

(72) Inventors: Ben Leshem, Tel Aviv (IL); Eran Small, Yehud (IL); Erez Na'aman, Tel Aviv (IL); Ittai Madar, Tel Aviv (IL)

(73) Assignee: SCOPIO LABS LTD., Tel Aviv (IL)

( * ) Notice: Subject to any disclaimer, the term of this patent is extended or adjusted under 35 U.S.C. 154(b) by 0 days.

(21) Appl. No.: 17/098,058

(22) Filed: Nov. 13, 2020

(65) Prior Publication Data

US 2021/0149169 A1 May 20, 2021

Related U.S. Application Data

(60) Provisional application No. 62/935,791, filed on Nov. 15, 2019.

(51) Int. Cl.
*G02B 21/00* (2006.01)
*G02B 21/34* (2006.01)
*G02B 21/06* (2006.01)
*G02B 21/36* (2006.01)

(52) U.S. Cl.
CPC ........... *G02B 21/006* (2013.01); *G02B 21/06* (2013.01); *G02B 21/34* (2013.01); *G02B 21/367* (2013.01)

(58) Field of Classification Search
CPC ...... G02B 21/006; G02B 21/06; G02B 21/34; G02B 21/367
See application file for complete search history.

(56) References Cited

U.S. PATENT DOCUMENTS 10,558,029 B2 2/2020 Leshem
10,705,326 B2 7/2020 Small
(Continued)

FOREIGN PATENT DOCUMENTS

WO 2017081539 5/2017
WO 2017081540 5/2017
(Continued)

OTHER PUBLICATIONS

International Application No. PCT/IL2019/051388, filed Dec. 19, 2019.
(Continued)

*Primary Examiner* — Girumsew Wendmagegn
(74) *Attorney, Agent, or Firm* — Fisherbroyles LLP; John Shimmick (57) ABSTRACT

A microscope for computational microscopic layer separation may include an imaging device that includes a lens and an image sensor, an illumination system for illuminating a sample, and an actuator to adjust an axial position of a focal plane with respect to the sample. The microscope may also include a processor operatively coupled to the imaging device and the illumination system. The processor may be configured to measure, using the image sensor and the illumination system, optical aberrations of the imaging device at the axial position, and determine whether to adjust the focal plane with respect to the sample in response to the one or more optical aberrations. Various other systems and methods are also disclosed.

20 Claims, 5 Drawing Sheets

(56) References Cited

U.S. PATENT DOCUMENTS

| | | | |
|---|---|---|---|
| 2013/0124159 A1* | 5/2013 | Chen | G06T 5/006 |
| | | | 703/2 |
| 2015/0160450 A1* | 6/2015 | Ou | G02B 21/365 |
| | | | 348/80 |
| 2018/0120553 A1* | 5/2018 | Leshem | G16H 30/40 |
| 2018/0348500 A1 | 12/2018 | Naaman, III | |
| 2018/0373016 A1 | 12/2018 | Leshem, III | |
| 2019/0235224 A1 | 8/2019 | Small | |
| 2019/0384962 A1 | 12/2019 | Hayut | |
| 2020/0041780 A1 | 2/2020 | Na'aman | |
| 2020/0110254 A1* | 4/2020 | Goegler | G02B 21/02 |
| 2020/0278362 A1 | 9/2020 | Hayut | |
| 2020/0278530 A1 | 9/2020 | Madar | |
| 2020/0302144 A1 | 9/2020 | Leshem | |
| 2020/0358946 A1* | 11/2020 | Zheng | H04N 5/2256 |

FOREIGN PATENT DOCUMENTS

| | | |
|---|---|---|
| WO | 2017081541 | 5/2017 |
| WO | 2017081542 | 5/2017 |
| WO | 2018078447 | 5/2018 |
| WO | 2018078448 | 5/2018 |
| WO | 2019077610 | 4/2019 |
| WO | 2019097523 | 5/2019 |
| WO | 2019097524 | 5/2019 |
| WO | 2020129064 | 6/2020 |
| WO | 2021095037 | 5/2021 |

OTHER PUBLICATIONS

International Application No. PCT/IL2020/051178, filed Nov. 15, 2020.

* cited by examiner

Method 300

Start

Measure, using an image sensor and an illumination system of a microscope, one or more optical aberrations of the imaging device at an axial position
310

Capture, using the image sensor, image data from a plurality of images at the axial position using a plurality of illumination angles
320

Calculate an amount of shift in the image data between the plurality of images
330

Determine, using the calculated amount of shift, a distance between the sample and a focal plane
340

Determine whether a focal plane is located on one or more of on a surface of a transparent material covering the sample, beneath a surface of the transparent material covering the sample, or within the sample in response to an amount of the one or more aberrations
350

Determine whether to adjust the focal plane with respect to the sample in response to the one or more optical aberrations
360

End

MICROSCOPE AND METHOD FOR COMPUTATIONAL MICROSCOPIC LAYER SEPARATION

RELATED APPLICATIONS

This application claims the benefit under 35 U.S.C. § 119(e) of U.S. Provisional Patent Application No. 62/935,791, filed Nov. 15, 2019, and titled "COMPUTATIONAL MICROSCOPIC LAYER SEPARATION," which is incorporated, in its entirety, by this reference.

BACKGROUND

Microscopy is an important field with many applications, such as health care and metrology. Work in relation to the present disclosure suggests that the prior approaches to focusing microscopes on samples and scanning microscope slides can be less than ideal in at least some respects. For example, with some of the prior approaches the amount of time to scan a sample can be longer than would be ideal. Also, automated approaches for setting the focus of the microscope can set the focus incorrectly in at least some instances.

In whole-slide digital microscopy, an area in the slide may be scanned by acquiring a series of fields of view ("FOVs"). When preparing a slide, a high refractive index material can be applied on top of the specimen in order to protect it from outside dirt, as well as securing it in place and flattening the sample. These materials may include a glass coverslip, film plastic coverslip, oils, glues or liquid coverslip. The use of a coverslip may result in two layers of data: "legitimate" data in between the slide and the coverslip, and "undesired" data above the coverslip. The latter may include dirt such as dust, glue residues, fingerprints, etc.

With prior approaches, dirt on top of the cover slip may be mistaken for legitimate data and may cause auto-focus algorithms to lock onto it in at least some instances. This problem can be more prevalent when the sample scanned is sparse, since in at least some FOVs dirt may be the dominant component in the image. This focusing on an inappropriate layer, such as dirt on top of a slide, can result in degraded microscope data or increased scan times in at least some instances.

Another prior approach for distinguishing between the two layers is to perform "z-stack" scanning through the focal planes of a FOV and finding the focal planes of the data along the way, e.g. by using sharpness metrics to determine where features are the sharpest throughout the scan. However, this approach can result in scan times that are longer than would be ideal and datasets that are larger than would be ideal in at least some instances.

Another prior approach for identification of the relevant sample layer is by using a special coverslip or slide, where several markings are printed at the interface between the coverslip and the slide. The printed markings could be recognized automatically and help the system reach the correct focal plane. Although helpful for identifying the correct focal plane, this approach relies on additional hardware, as well as algorithms that search for and lock onto the printed markings which may slow down the scan.

In light of the forgoing, there is a need for improved systems and methods of focusing microscopes that ameliorate at least some of the aforementioned limitations. Ideally these systems and methods would focus the microscope at an appropriate sample plane, without relying on additional hardware or appreciably increasing the time to scan a sample.

SUMMARY

In some embodiments, the systems and methods described herein provide improved scanning of microscope samples with improved placement of focal planes for data acquisition within samples, which can decrease scan times and the size of data obtained with a scan of a microscope slide. In some embodiments, one or more optical aberrations is measured and the focal plane adjusted in response to the aberrations. While the aberrations can be measured in many ways, in some embodiments the one or more aberrations is measured by illuminating the sample at a plurality of angles and an amount of the one or more aberrations determined in response to a shift among the plurality of images. The microscope may comprise an imaging device that images the sample through a coverslip with decreased aberrations as compared to material on the coverslip such as dirt. In some embodiments, the processor is configured with instructions to advance a focal plane toward a sample or not to advance the focal plane in response to an amount of the one or more aberrations.

In some embodiments, a microscope for computational microscopic layer separation comprises an imaging device that includes a lens and an image sensor, an illumination system for illuminating a sample, and an actuator to adjust an axial position of a focal plane with respect to the sample. The microscope may also include a processor operatively coupled to the imaging device and the illumination system. The processor may be configured to measure, using the image sensor and the illumination system, optical aberrations of the imaging device at the axial position, and determine whether to adjust the focal plane with respect to the sample in response to the one or more optical aberrations.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The present disclosure is generally directed to systems and methods for computational microscopic layer separation that may allow for correcting focus errors related to aberrations and to identify the sample for scanning, as compared to other material such as dirt on a coverslip. As will be explained in greater detail below, embodiments of the instant disclosure may be configured to measure one or more optical aberrations of an imaging device at an axial position. The focal plane of the imaging device may be adjusted with respect to the sample in response to the optical aberrations. The systems and methods described herein may improve the field of digital microscopy by being able to adjust the focal plane without the use of specialized hardware or microscope design.

The presently disclosed systems and methods are well suited for use with prior microscopes such as computational microscopes, and can be incorporated into and combined with such prior systems. An exemplary microscope suitable for modification in accordance with the present disclosure is described in U.S. Pat. No. 10,705,326, granted on Jul. 7, 2020, entitled "Autofocus system for a computational microscope", the entire disclosure of which is incorporated herein by reference.

Figure 1:
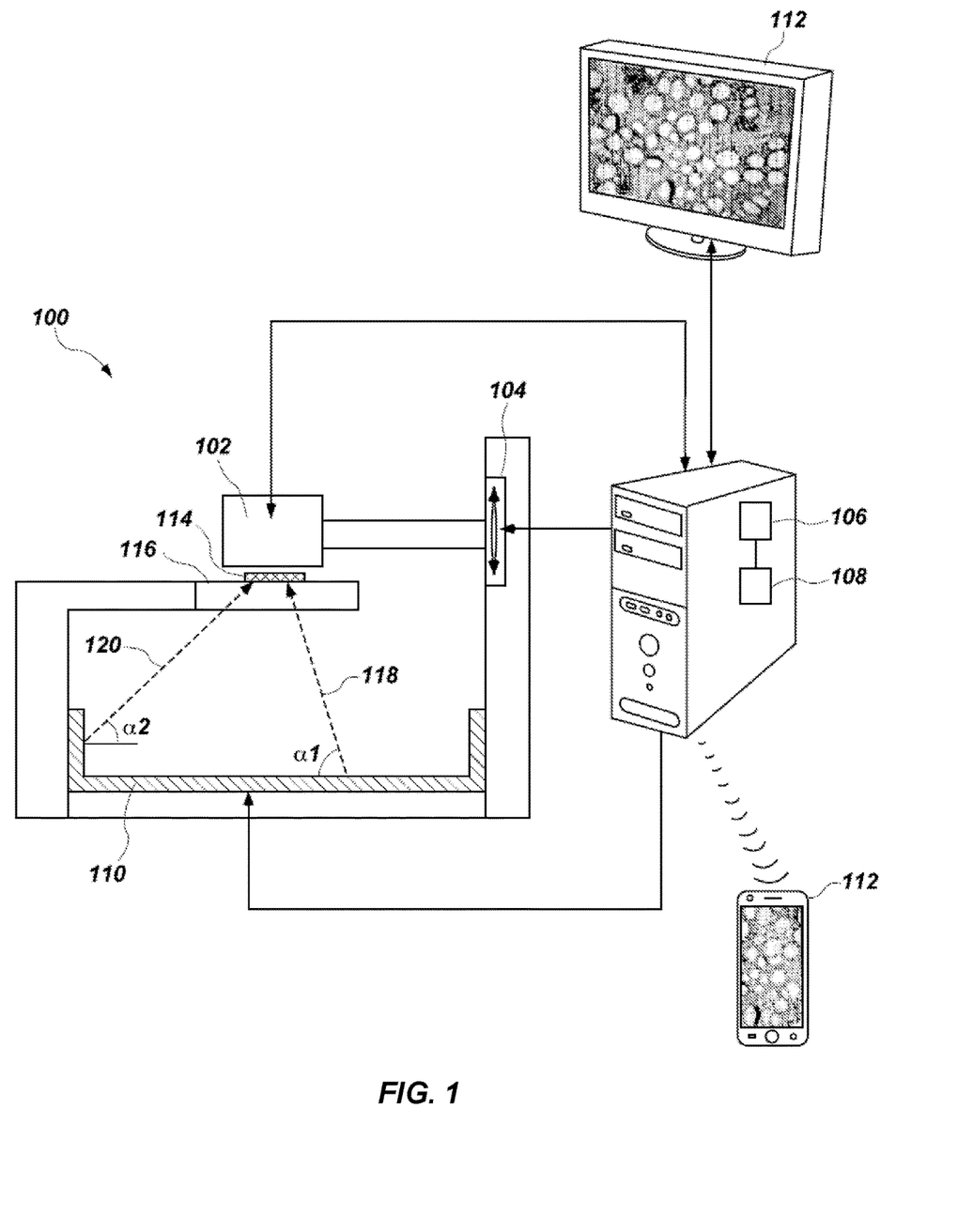
FIG. 1 shows a diagram of an exemplary microscope, in accordance with some embodiments.
Figure 2A:
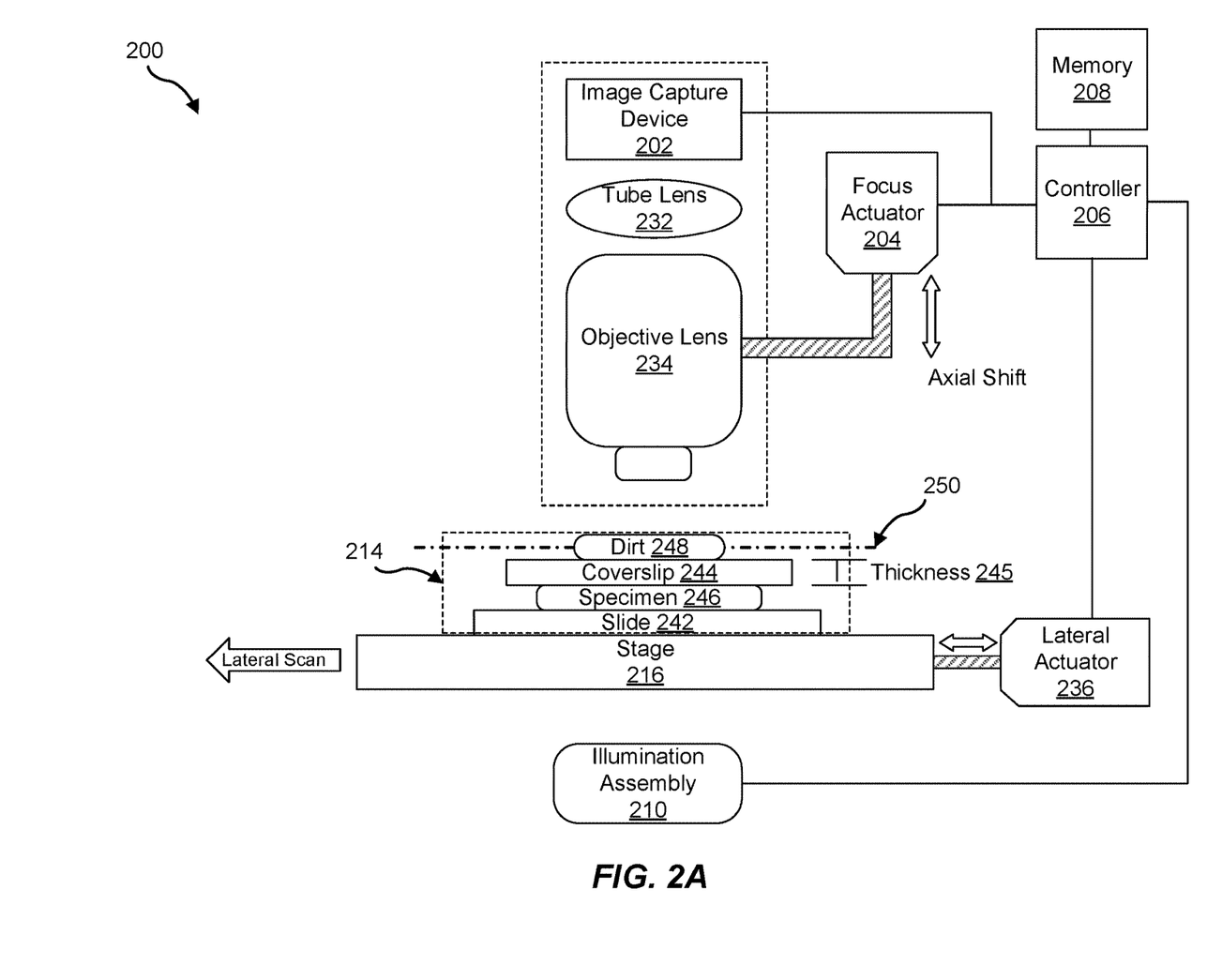
FIGS. 2A-B show diagrams of a focal plane of an exemplary microscope, in accordance with some embodiments.
Figure 2B:
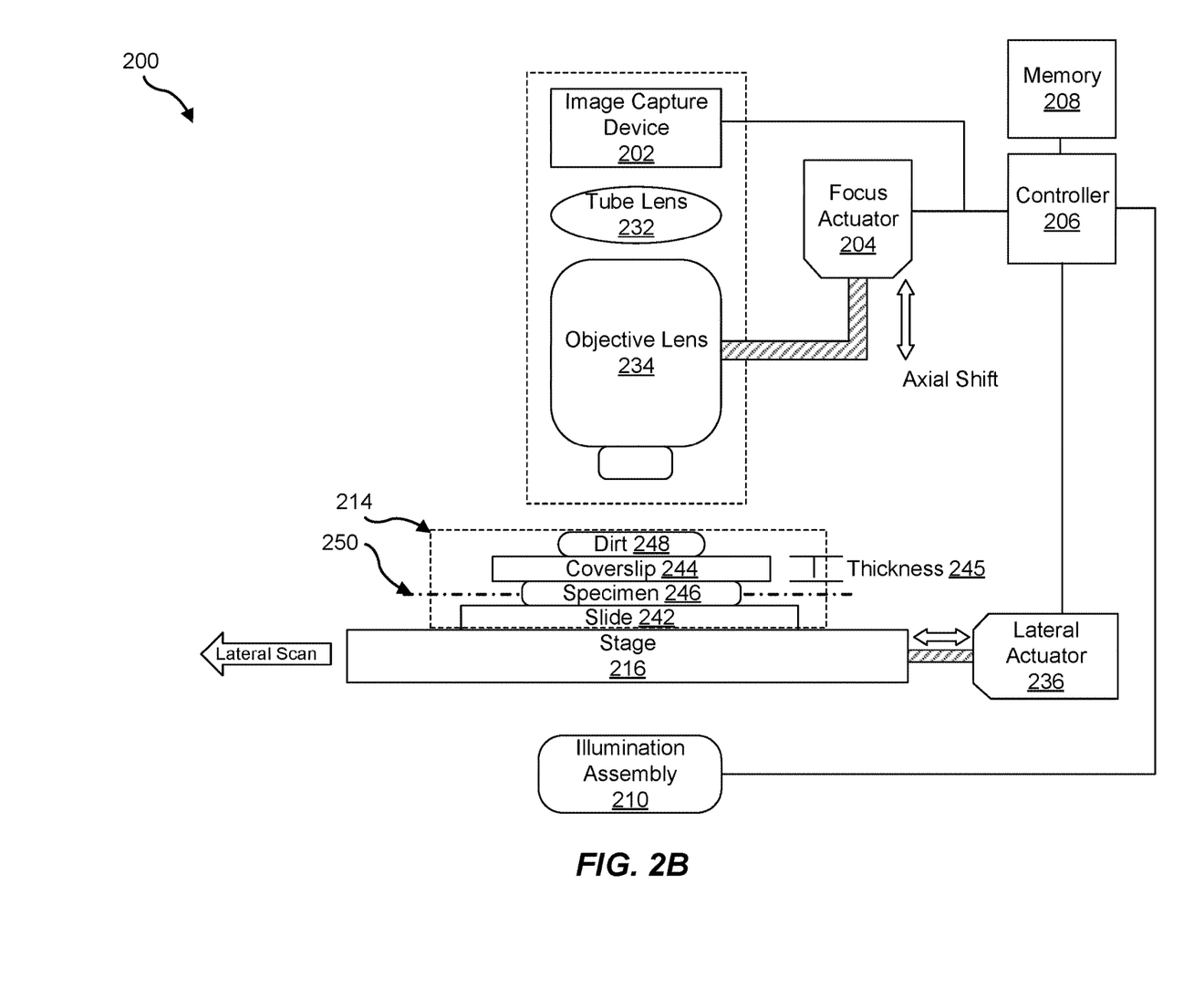
Figure 3:
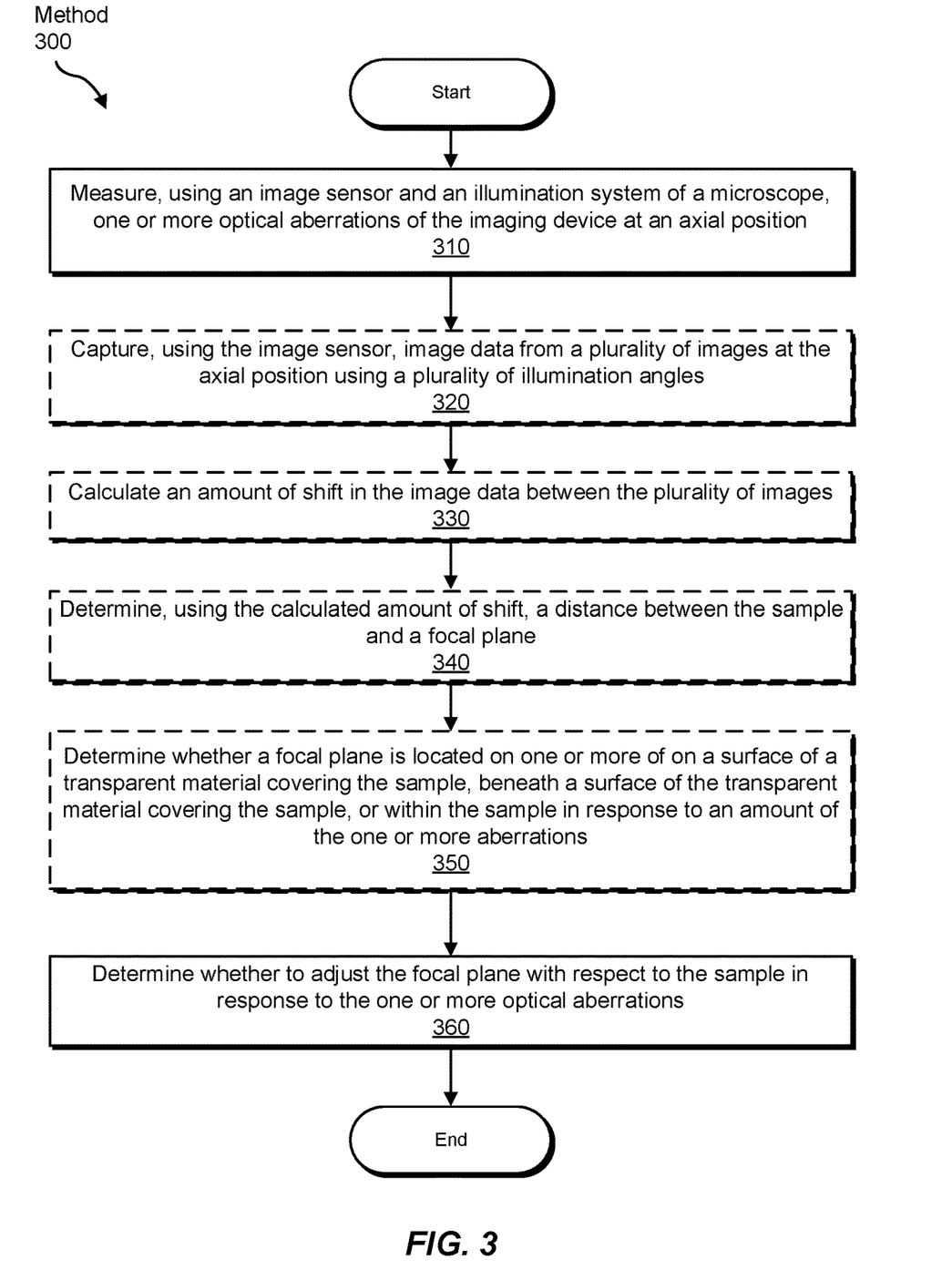
FIG. 3 shows a flow chart of a method of computational microscopic layer separation, in accordance with some embodiments.
Figure 4:
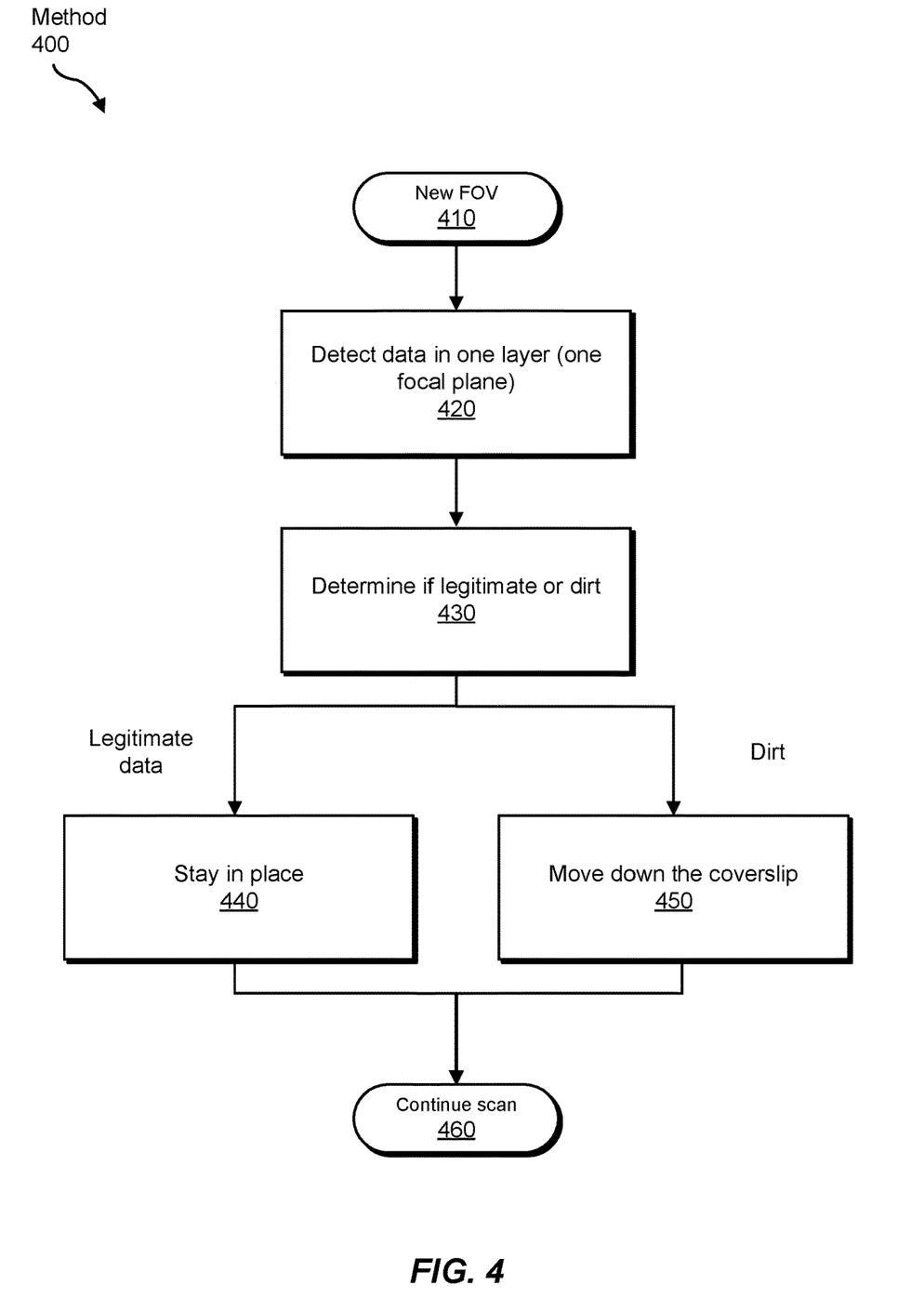
FIG. 4 shows a flow chart of a process of computational microscopic layer separation, in accordance with some embodiments.

Tomography refers generally to methods where a three-dimensional (3D) sample is sliced computationally into several 2D slices. Confocal microscopy refers to methods for blocking out-of-focus light in the image formation which improves resolution and contrast but tends to lead to focusing on a very thin focal plane and small field of view. Although reference is made to computational microscopy, the presently disclosed systems and methods are well suited for use with many types of microscopy such as one or more of a high definition microscope, a digital microscope, a computational microscope, a 3D microscope, a phase imaging microscope, a phase contrast microscope, a dark field microscope, a differential interference contrast microscope, a lightsheet microscope, a confocal microscope, a holographic microscope, or a fluorescence-based microscope The following will provide, with reference to FIGS. 1-4, detailed descriptions of computational microscopic layer separation. FIGS. 1 and 2A-B illustrate a microscope and various microscope configurations. FIGS. 3 and 4 illustrate an exemplary processes for computational microscopic layer separation.

FIG. 1 is a diagrammatic representation of a microscope 100 consistent with the exemplary disclosed embodiments. In some embodiments, the microscope comprises a device or instrument for magnifying an object which is smaller than easily observable by the naked eye, i.e., creating an image of an object for a user where the image is larger than the object. In some embodiments, the microscope comprises an optical microscope that uses light in combination with an optical system for magnifying an object. An optical microscope may be a simple microscope having one or more magnifying lens. In some embodiments, the microscope comprises a computational microscope, which comprises an image sensor and image-processing algorithms to enhance or magnify the object's size or other properties, such as resolving power of the microscope. The computational microscope may be a dedicated device or created by incorporating software and/or hardware with an existing optical microscope to produce high-resolution digital images. As shown in FIG. 1, microscope 100 comprises an image capture device 102, a focus actuator 104, a controller 106 connected to memory 108, an illumination assembly 110, and a user interface 112. An example usage of microscope 100 may be capturing images of a sample 114 mounted on a stage 116 located within the field-of-view (FOV) of image capture device 102, processing the captured images, and presenting on user interface 112 a magnified image of sample 114.

Image capture device 102 may be used to capture images of sample 114. In some embodiments, the image capture device comprises a device that records the optical signals entering a lens as an image or a sequence of images. The optical signals may be in the near-infrared, infrared, visible, and ultraviolet spectrums. Examples of an image capture device comprise a CCD camera, a CMOS camera, a color camera, a photo sensor array, a video camera, a mobile phone equipped with a camera, a webcam, a preview camera, a microscope objective and detector, etc. Some embodiments may comprise only a single image capture device 102, while other embodiments may comprise two, three, or even four or more image capture devices 102. In some embodiments, image capture device 102 may be configured to capture images in a defined field-of-view (FOV). Also, when microscope 100 comprises several image capture devices 102, image capture devices 102 may have overlap areas in their respective FOVs. Image capture device 102 may have one or more image sensors (not shown in FIG. 1) for capturing image data of sample 114. In other embodiments, image capture device 102 may be configured to capture images at an image resolution higher than VGA, higher than 1 Megapixel, higher than 2 Megapixels, higher than 5 Megapixels, 10 Megapixels, higher than 12 Megapixels, higher than 15 Megapixels, or higher than 20 Megapixels. In addition, image capture device 102 may also be configured to have a pixel size smaller than 15 micrometers, smaller than 10 micrometers, smaller than 5 micrometers, smaller than 3 micrometers, or smaller than 1.6 micrometer.

In some embodiments, microscope 100 comprises focus actuator 104. In some embodiments, the focus actuator comprises a device capable of converting input signals into physical motion for adjusting the relative distance between sample 114 and image capture device 102. Various focus actuators may be used, including, for example, linear motors, electrostrictive actuators, electrostatic motors, capacitive motors, voice coil actuators, magnetostrictive actuators, etc. In some embodiments, focus actuator 104 may comprise an analog position feedback sensor and/or a digital position feedback element. Focus actuator 104 is configured to receive instructions from controller 106 in order to make light beams converge to form a clear and sharply defined image of sample 114. In the example illustrated in FIG. 1, focus actuator 104 may be configured to adjust the distance by moving image capture device 102.

However, in other embodiments, focus actuator 104 may be configured to adjust the distance by moving stage 116, or by moving both image capture device 102 and stage 116. Microscope 100 may also comprise controller 106 for controlling the operation of microscope 100 according to the disclosed embodiments. Controller 106 may comprise various types of devices for performing logic operations on one or more inputs of image data and other data according to stored or accessible software instructions providing desired functionality. For example, controller 106 may comprise a central processing unit (CPU), support circuits, digital signal processors, integrated circuits, cache memory, or any other types of devices for image processing and analysis such as graphic processing units (GPUs). The CPU may comprise any number of microcontrollers or microprocessors configured to process the imagery from the image sensors. For example, the CPU may comprise any type of single- or multi-core processor, mobile device microcontroller, etc. Various processors may be used, including, for example, processors available from manufacturers such as Intel®, AMD®, etc. and may comprise various architectures (e.g., x86 processor, ARM®, etc.). The support circuits may be any number of circuits generally well known in the art, including cache, power supply, clock and input-output circuits. Controller 106 may be at a remote location, such as a computing device communicatively coupled to microscope 100.

In some embodiments, controller 106 may be associated with memory 108 used for storing software that, when executed by controller 106, controls the operation of microscope 100. In addition, memory 108 may also store electronic data associated with operation of microscope 100 such as, for example, captured or generated images of sample 114. In one instance, memory 108 may be integrated into the controller 106. In another instance, memory 108 may be separated from the controller 106.

Specifically, memory 108 may refer to multiple structures or computer-readable storage mediums located at controller 106 or at a remote location, such as a cloud server. Memory 108 may comprise any number of random access memories, read only memories, flash memories, disk drives, optical storage, tape storage, removable storage and other types of storage.

Microscope 100 may comprise illumination assembly 110. In some embodiments, the illumination assembly comprises a device or system capable of directing light to illuminate sample 114, such as illumination at a plurality of angles.

Illumination assembly 110 may comprise any number of light sources, such as light emitting diodes (LEDs), LED array, lasers, and lamps configured to emit light, such as a halogen lamp, an incandescent lamp, or a sodium lamp. For example, illumination assembly 110 may comprise a Kohler illumination source. Illumination assembly 110 may be configured to emit polychromatic light. For instance, the polychromatic light may comprise white light.

In one embodiment, illumination assembly 110 may comprise only a single light source. Alternatively, illumination assembly 110 may comprise four, sixteen, or even more than a hundred light sources organized in an array or a matrix. In some embodiments, illumination assembly 110 may use one or more light sources located at a surface parallel to illuminate sample 114. In other embodiments, illumination assembly 110 may use one or more light sources located at a surface perpendicular or at an angle to sample 114.

In addition, illumination assembly 110 may be configured to illuminate sample 114 in a series of different illumination conditions. In one example, illumination assembly 110 may comprise a plurality of light sources arranged in different illumination angles, such as a two-dimensional arrangement of light sources. In this case, the different illumination conditions may comprise different illumination angles. For example, FIG. 1 depicts a beam 118 projected from a first illumination angle $\alpha 1$, and a beam 120 projected from a second illumination angle $\alpha 2$. In some embodiments, first illumination angle $\alpha 1$ and second illumination angle $\alpha 2$ may have the same value but opposite sign. In other embodiments, first illumination angle $\alpha 1$ may be separated from second illumination angle $\alpha 2$. However, both angles originate from points within the acceptance angle of the optics.

In another example, illumination assembly 110 may comprise a plurality of light sources configured to emit light in different wavelengths. In this case, the different illumination conditions may comprise different wavelengths. For instance, each light source may be configured to emit light with a full width half maximum bandwidth of no more than 50 nm so as to emit substantially monochromatic light. In yet another example, illumination assembly 110 may be configured to use a number of light sources at predetermined times. In this case, the different illumination conditions may comprise different illumination patterns. For example, the light sources may be arranged to sequentially illuminate the sample at different angles to provide one or more of digital refocusing, aberration correction, or resolution enhancement. Accordingly and consistent with the present disclosure, the different illumination conditions may be selected from a group including: different durations, different intensities, different positions, different illumination angles, different illumination patterns, different wavelengths, or any combination thereof.

Consistent with disclosed embodiments, microscope 100 may comprise, be connected with, or in communication with (e.g., over a network or wirelessly, e.g., via Bluetooth) user interface 112. In some embodiments, a user interface comprises a device suitable for presenting a magnified image of sample 114 or any device suitable for receiving inputs from one or more users of microscope 100. FIG. 1 illustrates two examples of user interface 112. The first example is a smartphone or a tablet wirelessly communicating with controller 106 over a Bluetooth, cellular connection or a Wi-Fi connection, directly or through a remote server. The second example is a PC display physically connected to controller 106. In some embodiments, user interface 112 may comprise user output devices, including, for example, a display, tactile device, speaker, etc. In other embodiments, user interface 112 may comprise user input devices, including, for example, a touchscreen, microphone, keyboard, pointer devices, cameras, knobs, buttons, etc. With such input devices, a user may be able to provide information inputs or commands to microscope 100 by typing instructions or information, providing voice commands, selecting menu options on a screen using buttons, pointers, or eye-tracking capabilities, or through any other suitable techniques for communicating information to microscope 100. User interface 112 may be connected (physically or wirelessly) with one or more processing devices, such as controller 106, to provide and receive information to or from a user and process that information. In some embodiments, such processing devices may execute instructions for responding to keyboard entries or menu selections, recognizing and interpreting touches and/or gestures made on a touchscreen, recognizing and tracking eye movements, receiving and interpreting voice commands, etc.

Microscope 100 may also comprise or be connected to stage 116. Stage 116 comprises any horizontal rigid surface where sample 114 may be mounted for examination. Stage 116 may comprise a mechanical connector for retaining a slide containing sample 114 in a fixed position. The mechanical connector may use one or more of the following: a mount, an attaching member, a holding arm, a clamp, a clip, an adjustable frame, a locking mechanism, a spring or any combination thereof. In some embodiments, stage 116 may comprise a translucent portion or an opening for allowing light to illuminate sample 114. For example, light transmitted from illumination assembly 110 may pass through sample 114 and towards image capture device 102. In some embodiments, stage 116 and/or sample 114 may be moved using motors or manual controls in the XY plane to enable imaging of multiple areas of the sample.

FIG. 2A illustrates a basic schematic of an exemplary microscope according to some embodiments. FIG. 2A illustrates a microscope 200 (which may correspond to microscope 100), that may include a image capture device 202 (which may correspond to image capture device 102), a focus actuator 204 (which may correspond to focus actuator 104), a controller 206 (which may correspond to controller 106) connected to a memory 208 (which may correspond to memory 108), an illumination assembly 210 (which may correspond to illumination assembly 110), a tube lens 232, an objective lens 234, a sample 214 mounted on a stage 216 (which may correspond to stage 116), and a lateral actuator 236. Sample 214 may include a specimen 246 (e.g., the actual sample to be scanned), between a slide 242 and a coverslip 244 (having a thickness 245), and potentially dirt 248 on coverslip 244. Tube lens 232 and objective lens 234 may function in unison to focus light of a focal plane 250 (which may be determined based on a position of objective lens 234 as adjusted by focus actuator 204) of sample 214 in an FOV of image capture device 202. Tube lens 232 may comprise a multi-element lens apparatus in a tube shape, which focuses light in conjunction with objective lens 234. Lateral actuator 236 may comprise a motor or other actuator described herein that may be capable of physically moving stage 226 laterally in order to adjust a relative lateral position between sample 214 and image capture device 202. In some examples, focus actuator 204 and/or lateral actuator 236 may comprise a coarse actuator for long range motion and a fine actuator for short range motion. The coarse actuator may remain fixed while the fine focus actuator of focus actuator 204 adjusts the focal distance and lateral actuator 236 moves the lateral position of sample 214 for the movement paths. The coarse actuator may comprise a stepper motor and/or a servo motor, for example. The fine actuator may comprise a piezo electric actuator. The fine actuator may be configured to move sample 214 by a maximum amount within a range from 5 microns to 500 microns. The coarse actuator may be configured to move sample 214 by a maximum amount within a range from 1 mm to 100 mm.

Stage 216 may be configured to hold sample 214. Illumination assembly 210 may comprise an illumination source configured to illuminate sample 214. Image capture device 202 may be configured to capture multiple images or frames of sample 214 within an FOV of image capture device 202 at focal plane 250. Lateral actuator 236 may be configured to change a relative lateral position between image capture device 202 and an imaged portion of sample 214 within the FOV of image capture device 202 for each of the multiple images. Focus actuator 204 may be configured to adjust a focal distance (e.g., focal plane 250) between sample 214 and image capture device 202 between each of the multiple captured images. Controller 206, may comprise a processor operatively coupled to lateral actuator 236, focus actuator 204, image capture device 202, and/or illumination assembly 210 in order to move sample 214 laterally relative to the FOV and capture an area of sample 214 one or more times. In some examples, controller 206 may be configured to apply each of multiple light colors (using illumination assembly 210) for one or more captures.

Although the examples herein describe adjusting the relative lateral position by physically moving stage 216, in other embodiments the relative lateral position may be adjusted in other ways, including moving/shifting one or more of image capture device 202, tube lens 232, objective lens 234, sample 214, and/or stage 216. Likewise, although the examples herein describe adjusting the focal distance by physically moving objective lens 234, in other embodiments the focal distance may be adjusted in other ways, including moving/shifting one or more of image capture device 202, tube lens 232, objective lens 234, sample 214, and/or stage 216.

As seen in FIG. 2A, focal plane 250 may lie within dirt 248, which may not be desirable. Dirt 248 may lie on coverslip 244. Specimen 246, which may be a sample prepared for imaging, may be protected between coverslip 244 and slide 242. Coverslip 244 may comprise a solid or liquid coverslip comprising a transparent material such that image capture device 202 may capture specimen 246 through coverslip 244. However, because coverslip 244 may be transparent, focal plane 250 lying within dirt 248 on top of coverslip 244 may appear as legitimate data (e.g., may be confused for specimen 246). In some embodiments, the imaging device is configured to measure the sample with decreased aberrations through the coverslip as opposed to material located on top of the coverslip such as dirt, which can be related to the index of refraction of air as compared to the index of refraction of the coverslip.

FIG. 2B shows microscope 200, which may be correctly focused on sample 214 such that focal plane 250 lies within specimen 246. As will be described further below, microscope 200 may detect that focal plane 250 lies within dirt 248 (in FIG. 2A), and correct, via controlling focus actuator 204 to move objective lens 234, focal plane 250 by shifting focal plane 250 down into specimen 246, as seen in FIG. 2B. Although the present disclosure describes shifting focal plane 250 down, in other embodiments focal plane 250 may be shifted up and/or down as needed, using focus actuator 204 and/or lateral actuator 236 as needed.

FIG. 3 illustrates a flow chart of an exemplary method 300 for computational microscopic layer separation. In one example, each of the steps shown in FIG. 3 may represent an algorithm whose structure includes and/or is represented by multiple substeps, examples of which will be provided in greater detail below.

As illustrated in FIG. 3, at step 310 one or more of the systems described herein may measure, using the image sensor and the illumination system, one or more optical aberrations of the imaging device at the axial position. For example, controller 206 may measure, using image capture device 202 and illumination assembly 210, one or more optical aberrations of microscope 200 at the axial position, which may correspond to focal plane 250.

The optical aberrations may manifest in various ways. In some examples, the optical aberrations may comprise a spherical aberration. In some examples, the optical aberrations may comprise coma and/or astigmatism. In some examples, the optical aberrations may not comprise defocus. In other examples, the optical aberrations may comprise two or more optical aberrations, which may include defocus.

In some embodiments, one or more of image shifting, blurring or a spatially varying point spread function may be detected in acquired images in response to different illumination angles of the sample. Some aberrations, such as astigmatism and trefoil, can result in non-uniform image shifting in response to the plurality of illumination angles, which can be used to detect the type and amount of aberration. With astigmatism, the image shifting in response to the plurality of illumination angles may occur greater in one direction than another direction, e.g. asymmetrical, for example. With spherical aberration, such as fourth order and sixth order spherical aberration, the image shifting may remain substantially symmetrical with respect to the change in illumination angle, for example. In some embodiments, the amount of the image shifting for defocus may correspond to the angle of illumination. For example, a first illumination angle α1 closer to 90 degrees will provide less image shift than a second illumination angle α2 that is farther from 90 degrees than 90 degrees.

In some embodiments, one or more of the types of aberrations or the amount of the one or more aberrations is determined in response to the one or more of image shifting, blurring or a spatially varying point spread function. In some embodiments, the point spread function of the imaging system varies slowly across the image, and the amount of aberrations is determined in response to the spatially varying point spread function. In some embodiments, a portion of the image is analyzed, such that the change in the image related to illumination angle corresponds to one or more of the amount or type of the one or more aberrations. In some embodiments, a plurality of portions is analyzed to determine the localized aberrations for each of the plurality of portions of the image. Alternatively or in combination, each of the plurality of portions can be analyzed to determine change in image structure in response to the plurality of illumination angles. Although reference is made to image shifting to determine one or more of an amount or type of aberrations, in some embodiments the one or more aberrations is determined without measuring image shifting, for example with an artificial intelligence algorithm such as one or more of machine learning, a neural network, or a convolutional neural network and other approaches and combinations thereof as described herein, which can detect subtle change in image structure related to the one or more aberrations in order to determine the one or more aberrations.

Optionally, at step 320 one or more of the systems described herein may capture, using the image sensor, image data from a plurality of images at the axial position using the plurality of illumination angles. For example, controller 206 may capture, using image capture device 202, image data from multiple images at the axial position (e.g., focal plane 250), using multiple illumination angles from illumination assembly 210.

In some examples, illumination assembly 210 may be configured to illuminate sample 214 (e.g., specimen 246) at a plurality of illumination angles. For instance, illumination assembly 210 may comprise a variable illumination source, such as an LED array positioned to illuminate sample 214 with one or more plane waves or approximate plane waves, from different angles at different times. Illumination assembly 210 may illuminate sample 214 with more than one plane wave at the same time, such as pairs of plane waves from different angles.

More specifically, illumination assembly 210 may include a plurality of light sources. In some examples, controller 206 may illuminate the sample from the plurality of illumination angles simultaneously with simultaneous activation of a plurality of light sources using illumination assembly 210. In other examples, controller 206 may illuminate the sample from the plurality of illumination angles sequentially with sequential activation of the plurality of light using illumination assembly 210.

Optionally, at step 330 one or more of the systems described herein may calculate an amount of shift in the image data between the plurality of images. For example, controller 206 may calculate the amount of shift in the image data between the plurality of images. The shift in the image data and corresponding illumination angles can be used to determine the amount of the one or more aberrations as described herein.

In some examples, controller 206 may use one or more of cross-correlation, a feature extraction and matching algorithm, and/or a data driven algorithm such as neural networks to detect an effective shift in each of the images acquired using illumination assembly 210 at different angles of illumination.

In some examples, controller 206 may use knowledge of the properties of the optical system, such as numerical aperture ("NA"), and the effective shift calculated above to construct a set of linear and/or non-linear equations. Controller 206 may solve the set of equations to determine the unknown aberrations.

In some examples, to reduce a number of unknowns in the set of equations, controller 206 may know or partially know some of the aberrations and/or defocus. For example, sample 214 may be sufficiently defocused in one direction such that a magnitude of the defocus is determined. In other examples, controller 206 may already know one or more of the aberrations. For instance, controller 206 may comprise values corresponding to known amounts of aberrations except for defocus and spherical aberrations in order to achieve a more robust reconstruction via the equations. In another example, controller 206 comprise values corresponding only a magnitude and/or sign of some aberrations. In yet other examples, controller 206 may have values corresponding to the sign of some aberrations such that the constructed equations may be non-linear.

In some embodiments, if it is a priori known, e.g. based on the system configuration, that most of the aberrations are insignificant or known, and only some aberrations (e.g., defocus and/or spherical aberrations) are significant, controller 206 may consider only defocus and/or spherical aberrations as unknowns and consider the rest of the aberrations as known or ignored (if unknown) when solving the equations. The measured aberrations (which may or may not include defocus), may be used as the initial condition for computational microscopy reconstruction.

Optionally, at step 340 one or more of the systems described herein may determine, using the calculated amount of shift or other image data as described herein, a distance between the sample and the focal plane. For example, controller 206 may determine, using the calculated amount of shift, a distance between focal plane 250 and specimen 246.

In some examples, controller 206 may determine whether an object located at the focal plane is in focus in response to an image shift from images captured with the image sensor and to adjust the axial position of the focal plane in response to the object being in focus and an amount of the one or more aberrations above a threshold amount. As will be explained further below, controller 206 may adjust focal plane 250 in response to dirt 248 being in focus and the amount of aberrations exceeding a threshold amount. In some examples, controller 206 may determine the adjustment based in part on thickness 245 of coverslip 244, which may be known, in order to adjust focal plane 250 into specimen 246.

Although optional steps 320-340 are presented sequentially after step 310 in FIG. 3, in some embodiments one or more of steps 320-340 may comprise substeps of step 310. In other embodiments, one or more of steps 320-340 may be performed or skipped as appropriate.

Optionally, at step 350 one or more of the systems described herein may determine whether the focal plane is located on one or more of on a surface of a transparent material covering the sample, beneath a surface of the transparent material covering the sample or within the sample in response to an amount of the one or more aberrations. For example, controller 206 may determine whether focal plane 250 is located on a surface of coverslip 244, beneath the surface of coverslip 244, or within specimen 246, in response to the amount of aberrations.

In some examples, focal plane 250 may comprise an axial location within a depth of field of image capture device 202.

In some examples, image capture device 202 may be configured to image sample 214 with the transparent material (e.g., coverslip 244) covering sample 214 with a decreased amount of aberrations as compared to the transparent material not covering sample 214. Controller 206 may be configured with instructions to adjust focal plane 250 toward sample 214 (e.g., as seen the shift in focal plane 250 from FIG. 2A to FIG. 2B) in order to decrease the one or more aberrations.

In some examples, image capture device 202 may be configured to image an object with decreased aberrations with focal plane 250 of image capture device 202 located beneath an upper surface of the transparent covering material (e.g., coverslip 244) as compared to focal plane 250 located on or above the upper surface.

In some examples, controller 206 may be configured to determine whether focal plane 250 is located on dirt 248 on a surface of the transparent material (e.g., coverslip 244) covering sample 214 (e.g., specimen 246) or on sample 214 beneath the surface of the covering material in response to the amount of the one or more aberrations and a structure of an image captured with image capture device 202 at the axial position. For example, controller 206 may determine whether focal plane 250 is located on dirt 248, as in FIG. 2A, or on specimen 246, as in FIG. 2B, in response to one or more of the amount of aberrations detected, or a structure of the image captured.

In some examples, sample 214 (e.g., specimen 246) may comprise a sparse sample. In some examples, the transparent material (e.g. coverslip 244) covering sample 214 may comprise a solid coverslip and/or a liquid coverslip. In some examples, the transparent material covering sample 214 may comprise an index of refraction of at least 1.4.

In some examples, controller 206 may be configured to determine the amount of the one or more aberrations in response to the calculated amount of shift, as described herein. For example, the amount of the one or more optical aberrations may be compared to a predetermined value of the one or more optical aberrations. Additionally, the axial position may be adjusted in response to the amount being greater than the predetermined value or not adjusted in response to the amount being less than the predetermined value.

In some examples, controller 206 may be configured to determine whether the one or more optical aberrations correspond to a presence of a transparent material (e.g., coverslip 244) covering sample 214 between the lens (e.g., objective lens 234 and/or tube lens 232) and focal plane 250.

Although FIG. 3 illustrates optional step 350 as sequentially following step 340, in some embodiments step 350 may comprise a substep of any of the steps of method 300, such as a substep of step 310. In some embodiments, one or more of steps 320-340 may be performed or skipped before step 350. In some embodiments, step 350 may be performed before one or more of steps 320-340, in conjunction with one or more of steps 320-340, or alternatively to one or more of steps 320-340.

At step 360 one or more of the systems described herein may determine whether to adjust the focal plane with respect to the sample in response to the one or more optical aberrations. For example, controller 206 may determine, based on the one or more optical aberrations, to adjust focal plane 250, such as the shift depicted between FIG. 2A and FIG. 2B as further described herein.

Although FIG. 3 illustrates a specific sequence of steps, in other embodiments the steps may be performed in another order, simultaneously, skipped, or repeated, such as one or more of optional steps 320-350.

FIG. 4 illustrates a flow chart of an exemplary method 400 for computational microscopic layer separation. In one example, each of the steps shown in FIG. 4 may represent an algorithm whose structure includes and/or is represented by multiple substeps, examples of which will be provided in greater detail below.

As illustrated in FIG. 4, at step 410 one or more of the systems described herein may begin with a new FOV. For example, controller 206 may adjust objective lens 234 and/or stage 216, using focus actuator 204 and/or lateral actuator 236, to initial or default positions after sample 214 is mounted onto stage 216 to start scanning. Although focal plane 250 should preferably be located at specimen 246, as in FIG. 2B, focal plane 250 may possibly be in an undesired position, as in FIG. 2A. In one example, controller 206 may have erroneously autofocused onto dirt 248, or otherwise incorrectly adjusted focal plane 250.

At step 420 one or more of the systems described herein may detect data in one layer (e.g., one focal plane). For example, controller 206, using image capture device 202, may capture data using a current position of focal plane 250. Depending on where focal plane 250 is positioned, the data captured may be legitimate (e.g., in FIG. 2B), or may be unwanted data (e.g., in FIG. 2A).

At step 430 one or more of the systems described herein may determine if the detected data is legitimate or dirt. For example, controller 206 may determine whether the detected data is legitimate (e.g., focal plane 250 is located within specimen 246 as in FIG. 2B) or dirt (e.g., focal plane 250 is located within dirt 248 as in FIG. 2A). Controller 206 may determine whether the detected data is legitimate by, for example as described above, detecting a number of aberrations and comparing the number of detected aberrations to a threshold value of aberrations. If the detected number exceeds the threshold value, the detected data may be dirt, and method 400 may proceed to step 450. Otherwise, the detected data may be legitimate, and method 400 may proceed to step 440.

If the detected data is determined to be legitimate, then at step 440 one or more of the systems described herein may stay in place, if the detected data is legitimate data. For example, controller 206 may not shift focal plane 250 as focal plane 250 may already be located within specimen 246, as in FIG. 2B.

If the detected data is determined to be dirt, then at step 450 one or more of the systems described herein may move down the coverslip, if the detected data is dirt. For example, controller 206 may determine how much axial adjustment is needed to move focal plane 250 beyond coverslip 244 and into specimen 246, as described above. Controller 206 may accordingly control focus actuator 204 to move objective lens 234 and/or lateral actuator 236 to move stage 216 such that focal plane 250 is moved from dirt 248, as seen in FIG. 2A, into specimen 246, as seen in FIG. 2B.

At step 460 one or more of the systems described herein may continue scanning. For example, once focal plane 250 is at a desired position within specimen 246, controller 206 may control image capture device 202 to captured image data of specimen 246 and continue the scanning of sample 214.

The steps of method 400 may be performed in any order and repeated as needed. For example, multiple focal planes of specimen 246 may be scanned, and one or more of the desired focal planes may undergo method 400.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "controller", "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor. The processor may comprise a distributed processor system, e.g. running parallel processors, or a remote processor such as a server, and combinations thereof.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. A microscope comprising: at least one imaging device comprising lens and an image sensor; an illumination system for illuminating a sample; an actuator to adjust an axial position of a focal plane with respect to the sample; and a processor operatively coupled to the at least one imaging device and the illumination system, the processor configured to: measure, using the image sensor and the illumination system, one or more optical aberrations of the imaging device at the axial position; and determine whether to adjust the focal plane with respect to the sample in response to the one or more optical aberrations.

Clause 2. The microscope of clause 1, wherein the processor is configured to determine whether the focal plane is located on one or more of on a surface of a transparent material covering the sample, beneath a surface of the transparent material covering the sample or within the sample in response to an amount of the one or more aberrations.

Clause 3. The microscope of clause 2, wherein the imaging device is configured to image the sample with the transparent material covering the sample with a decreased amount of aberrations as compared to the transparent material not covering the sample and wherein the processor is configured with instructions to adjust the focal plane toward the sample in order to decrease the one or more aberrations.

Clause 4. The microscope of clause 2, wherein the imaging device is configured to image an object with decreased aberrations with the focal plane of the imaging device located beneath an upper surface of the transparent material as compared to the focal plane located on or above the upper surface.

Clause 5. The microscope of clause 2, wherein the processor is configured to determine whether the focal plane is located on dirt on a surface of the transparent material covering the sample or on the sample beneath the surface of the transparent material in response to the amount of the one or more aberrations and a structure of an image captured with the at least one imaging device at the axial position.

Clause 6. The microscope of clause 5, wherein the sample comprises a sparse sample.

Clause 7. The microscope of clause 2, wherein the transparent material covering the sample comprises one or more of a solid coverslip or a liquid coverslip.

Clause 8. The microscope of clause 2, wherein the transparent material covering the sample comprises an index of refraction of at least 1.4.

Clause 9. The microscope of clause 1, further comprising an illumination system to illuminate a sample at a plurality of illumination angles.

Clause 10. The microscope of clause 9, wherein the processor is configured to: capture, using the image sensor, image data from a plurality of images at the axial position using the plurality of illumination angles; calculate an amount of shift in the image data between the plurality of images; and determine, using the calculated amount of shift, a distance between the sample and the focal plane.

Clause 11. The microscope of clause 10, wherein the processor is configured to determine the amount of the one or more aberrations in response to the calculated amount of shift.

Clause 12. The microscope of clause 10, wherein the processor is configured to illuminate the sample from the plurality of illumination angles simultaneously with simultaneous activation of a plurality of light sources.

Clause 13. The microscope of clause 12, wherein the processor is configured to illuminate the sample from the plurality of illumination angles sequentially with sequential activation of the plurality of light sources.

Clause 14. The microscope of clause 1, wherein the amount of the one or more optical aberrations is compared to a predetermined value of the one or more optical aberrations and optionally wherein the axial position is adjusted in response to the amount being greater than the predetermined value or not adjusted in response to the amount being less than the predetermined value.

Clause 15. The microscope of clause 1, wherein the processor is configured to determine whether the one or more optical aberrations correspond to a presence of a transparent material covering the sample between the lens and the focal plane.

Clause 16. The microscope of clause 1, wherein the processor is configured with instructions to determine whether an object located at the focal plane is in focus in response to an image shift from images captured with the image sensor and to adjust the axial position of the focal plane in response to the object being in focus and an amount of the one or more aberrations above a threshold amount.

Clause 17. The microscope of clause 1, wherein the one or more optical aberrations comprises a spherical aberration.

Clause 18. The microscope of clause 17, wherein the one or more optical aberrations comprises one or more of coma or astigmatism.

Clause 19. The microscope of clause 1, wherein the one or more optical aberrations does not comprise defocus.

Clause 20. The microscope of clause 1, wherein the one or more optical aberrations comprise two or more optical aberrations and wherein the two or more optical aberrations include defocus.

Clause 21. The microscope of clause 1, wherein the focal plane comprises an axial location within a depth of field of the at least one imaging device.

Clause 22. A method comprising: illuminating a sample with an illumination system; imaging the sample with at least one imaging device comprising lens and an image sensor; adjusting, with an actuator, an axial position of a focal plane with respect to the sample; and measuring, using the image sensor and the illumination system, one or more optical aberrations of the imaging device at the axial position; and determining whether to adjust the focal plane with respect to the sample in response to the one or more optical aberrations.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof

What is claimed is:

1. A microscope comprising:
at least one imaging device comprising lens and an image sensor;
an illumination system for illuminating a sample;
an actuator to adjust an axial position of a focal plane with respect to the sample; and
a processor operatively coupled to the at least one imaging device and the illumination system, the processor configured to:
measure, using the image sensor and the illumination system, one or more optical aberrations of the imaging device at the axial position; and
determine whether to adjust the focal plane with respect to the sample in response to the one or more optical aberrations, wherein the processor is configured to determine whether the one or more optical aberrations corresponds to a presence of a transparent material covering the sample between the lens and the focal plane;
wherein the at least one imaging device is configured to image an object with decreased aberrations with the focal plane of the imaging device located beneath an upper surface of the transparent material as compared to the focal plane located on or above the upper surface.

2. The microscope of claim 1, wherein the processor is configured to determine whether the focal plane is located on one or more of on a surface of the transparent material covering the sample, beneath the surface of the transparent material covering the sample or within the sample in response to an amount of the one or more aberrations.

3. The microscope of claim 2, wherein the imaging device is configured to image the sample with the transparent material covering the sample with a decreased amount of aberrations as compared to the transparent material not covering the sample and wherein the processor is configured with instructions to adjust the focal plane toward the sample in order to decrease the one or more aberrations.

4. The microscope of claim 2, wherein the processor is configured to determine whether the focal plane is located on dirt on a surface of the transparent material covering the sample or on the sample beneath the surface of the transparent material in response to the amount of the one or more aberrations and a structure of an image captured with the at least one imaging device at the axial position.

5. The microscope of claim 4, wherein the sample comprises a sparse sample.

6. The microscope of claim 2, wherein the transparent material covering the sample comprises one or more of a solid coverslip or a liquid coverslip.

7. The microscope of claim 2, wherein the transparent material covering the sample comprises an index of refraction of at least 1.4.

8. The microscope of claim 1, wherein the illumination system is configured to illuminate the sample at a plurality of illumination angles.

9. The microscope of claim 8, wherein the processor is configured to:
capture, using the image sensor, image data from a plurality of images at the axial position using the plurality of illumination angles;
calculate an amount of shift in the image data between the plurality of images; and
determine, using the calculated amount of shift, a distance between the sample and the focal plane.

10. The microscope of claim 9, wherein the processor is configured to determine the amount of the one or more aberrations in response to the calculated amount of shift.

11. The microscope of claim 9, wherein the processor is configured to illuminate the sample from the plurality of illumination angles simultaneously with simultaneous activation of a plurality of light sources.

12. The microscope of claim 11, wherein the processor is configured to illuminate the sample from the plurality of illumination angles sequentially with sequential activation of the plurality of light sources.

13. The microscope of claim 1, wherein the amount of the one or more optical aberrations is compared to a predetermined value of the one or more optical aberrations and optionally wherein the axial position is adjusted in response to the amount being greater than the predetermined value or not adjusted in response to the amount being less than the predetermined value.

14. The microscope of claim 1, wherein the processor is configured with instructions to determine whether an object located at the focal plane is in focus in response to an image shift from images captured with the image sensor and to adjust the axial position of the focal plane in response to the object being in focus and an amount of the one or more aberrations above a threshold amount.

15. The microscope of claim 1, wherein the one or more optical aberrations comprises a spherical aberration.

16. The microscope of claim 15, wherein the one or more optical aberrations comprises one or more of coma or astigmatism.

17. The microscope of claim 1, wherein the one or more optical aberrations does not comprise defocus.

18. The microscope of claim 1, wherein the one or more optical aberrations comprise two or more optical aberrations and wherein the two or more optical aberrations include defocus.

19. The microscope of claim 1, wherein the focal plane comprises an axial location within a depth of field of the at least one imaging device.

20. A method comprising:
illuminating a sample with an illumination system;
imaging the sample with at least one imaging device comprising lens and an image sensor;
adjusting, with an actuator, an axial position of a focal plane with respect to the sample; and
measuring, using the image sensor and the illumination system, one or more optical aberrations of the imaging device at the axial position; and
determining, with a processor, whether to adjust the focal plane with respect to the sample in response to the one or more optical aberrations, wherein the processor determines whether the one or more optical aberrations corresponds to a presence of a transparent material covering the sample between the lens and the focal plane, wherein the at least one imaging device is configured to image an object with decreased aberrations with the focal plane of the imaging device located beneath an upper surface of the transparent material as compared to the focal plane located on or above the upper surface.

* * * * *